United States Patent [19]

Draaisma

[11] Patent Number: 5,796,562
[45] Date of Patent: Aug. 18, 1998

[54] MAGNETIC HEAD COMPRISING A MULTILAYER STRUCTURE WITH ELECTRICALLY CONDUCTING HEAD ELEMENTS

[75] Inventor: Eeltje A. Draaisma, Eindhoven, Netherlands

[73] Assignee: U.S. Philips Corporation, New York, N.Y.

[21] Appl. No.: 768,490

[22] Filed: Dec. 18, 1996

[30] Foreign Application Priority Data

Dec. 27, 1995 [EP] European Pat. Off. ............ 95203639

[51] Int. Cl.⁶ .................. G11B 5/29; G11B 5/127
[52] U.S. Cl. ................. 360/121; 360/122; 360/113
[58] Field of Search ....................... 360/121, 122, 360/113

[56] References Cited

U.S. PATENT DOCUMENTS

| | | |
|---|---|---|
| 3,821,815 | 6/1974 | Abbott et al. ............ 360/122 X |
| 4,072,993 | 2/1978 | Nomura et al. ............ 360/121 |
| 5,065,483 | 11/1991 | Zammit ....................... 29/603 |
| 5,218,755 | 6/1993 | Gassen et al. ............... 29/603 |

FOREIGN PATENT DOCUMENTS

0556891A1   8/1993   European Pat. Off. .......... G11B 5/11

*Primary Examiner*—J. T. Wolff
*Attorney, Agent, or Firm*—John C. Fox

[57] ABSTRACT

Magnetic head having a head face (1) and comprising a substrate (3) which is provided with a multilayer structure (5) with electrically conducting head elements (7) which are electrically arranged between electrically conducting connecting tracks (9; 11). For realizing the required connecting tracks in a simple manner, a set of connecting tracks (9) is implemented substantially as a common electric conductor (9A).

8 Claims, 4 Drawing Sheets

MAGNETIC HEAD COMPRISING A MULTILAYER STRUCTURE WITH ELECTRICALLY CONDUCTING HEAD ELEMENTS

BACKGROUND OF THE INVENTION

The invention relates to a magnetic head having a head face and comprising a substrate which is provided with a multilayer structure with electrically conducting head elements which are electrically arranged between electrically conducting connecting tracks.

A magnetic head of this type is known from EP-A 0 556 891. The known magnetic head has a multilayer structure, provided on a substrate, with a plurality of electrically conducting head elements such as magnetoresistive elements and bias elements for biasing the magnetoresistive elements. Each head element present is provided with a pair of electrically conducting connecting tracks terminating in a connection face. The connecting tracks, which thus extend between head elements and connection faces, are present as a pattern of tracks in a layer of the multilayer structure in which the pattern is formed by means of structuring. The size of the pattern of tracks is largely determined by the number of head elements present in the magnetic head. The more head elements are used, the more connecting tracks must be realized in the pattern of tracks. With an increasing number of head elements, the pattern of tracks will become more complicated and more difficult to realize in the available space. Moreover, such a pattern of tracks is an impediment to miniaturization of magnetic heads.

OBJECTS AND SUMMARY OF THE INVENTION

It is an object of the invention to provide a magnetic head of the type described in the opening paragraph, in which a plurality of connecting tracks is realized in a simple manner.

The magnetic head according to the invention is characterized in that a set of connecting tracks is implemented substantially as a common electric conductor. The measure used in the magnetic head according to the invention provides ample possibilities for realizing suitable patterns of connecting tracks. By implementing a plurality of the total number of connecting tracks, comprising both collect tracks and return tracks, substantially as a common conductor, for example, the return tracks, a greater freedom of creating a suitable layout is obtained for the remaining number. An additional, but important advantage is that the use of the common conductor leads to a lower electric resistance of the total system of connecting tracks. A further advantage is that the common electric conductor does not need to be structured, which leads to an economy of manufacturing costs of the magnetic head.

The head elements used in the magnetic head according to the invention may be transducing elements such as magnetoresistive elements or inductive elements, but they may alternatively be different functional conducting elements such as bias windings and/or test windings or head face sensors.

An embodiment of the magnetic head according to the invention is characterized in that the common conductor is constituted by an electrically conducting layer of the multilayer structure. In this embodiment, use may be made of a substrate which is electrically non-conducting or has a poor conductivity, which substrate is provided with the layer constituting the common conductor by deposition of material having a satisfactory electrical conductivity, using known deposition methods such as vapour deposition or sputtering. Suitable materials are, for example, gold or chromium. The electrically conducting layer does not need to be structured.

An embodiment of the magnetic head according to the invention is characterized in that the substrate is electrically conducting and constitutes the common conductor. In this embodiment, the common conductor is realized in an extremely simple manner, in which the electrically conducting layer used in the embodiment described hereinbefore is constituted by the substrate itself, so that it is not necessary to provide an electrically conducting layer during manufacture of the magnetic head. A suitable electrically conducting substrate material is, for example, the ceramic material $Al_2O_3/TiC$ or an electrically conducting ferrite such as MnZn ferrite.

An embodiment of the magnetic head according to the invention is characterized in that the common conductor, on the one hand, and head elements electrically connected to connecting tracks of the set of connecting tracks, on the other hand, are present in different planes, while electric through-connections are present between the common conductor and the last-mentioned head elements. The through-connections, which are provided in an electrically insulating layer extending between the common conductor and said head elements, can be realized during manufacture of the magnetic head by means of known structuring and deposition methods such as etching, vapour deposition or sputtering, respectively. The through-connections require little space, particularly because they usually extend substantially transversely to the layers. A further advantage is the great freedom of choice of the magnetic head layout, resulting, for example, in a magnetic head having surprisingly small dimensions.

An embodiment of the magnetic head according to the invention is characterized in that the common conductor is electrically connected to a connection face constituting a common connection face for the set of connecting tracks. In this embodiment, the number of required connection faces is limited, which facilitates the connection of the magnetic head to an external source. Moreover, the limited number of connection faces provides the possibility of smaller dimensions of the magnetic head.

An embodiment of the magnetic head according to the invention is characterized in that the common conductor and the connection face are present in different planes, an electric through-connection being present between the common conductor and the connection face. This embodiment provides the possibility of positioning all connection faces in one and the same plane. The through-connection used is provided in an electrically insulating layer extending between the common conductor and the connection face. Such a layer may be formed, for example, from $Al_2O_3$ or $SiO_2$.

The invention also relates to a device for writing and/or reading a magnetic record carrier, including the magnetic head according to the invention. The device may be an audio, video or data-storage device, in which the record carrier is a magnetic tape or a magnetic disc.

These and other aspects of the invention will be apparent from and elucidated with reference to the embodiments described hereinafter.

DESCRIPTION OF THE PREFERRED EMBODIMENTS

Figure 1:
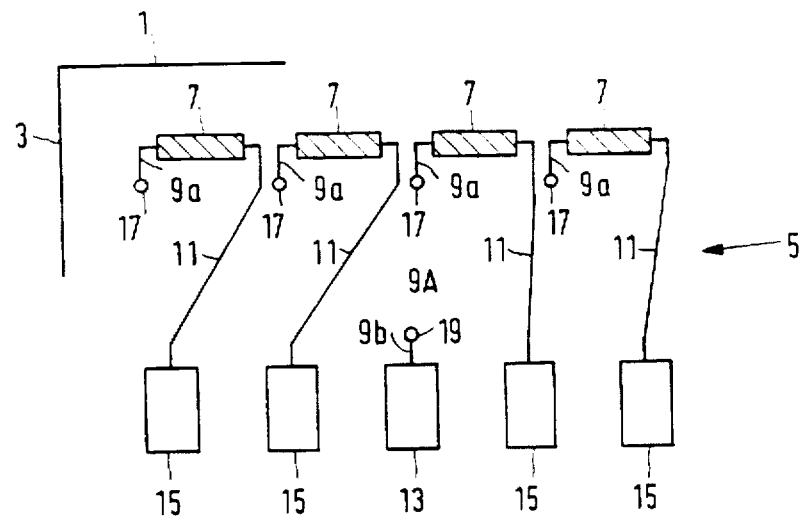
FIG. 1 shows diagrammatically the magnetic head according to the invention.

The magnetic head according to the invention, shown diagrammatically in FIG. 1, has a head face 1 and comprises a substrate 3 which is provided with a multilayer structure 5. The multilayer structure 5 is provided with electrically conducting head elements 7, such as transducing elements. Each head element 7 is electrically arranged between an electrically conducting connecting track 9a and electrically conducting connecting tracks 11. A set of connecting tracks is substantially implemented as a common conductor 9A. The common conductor 9A may be constituted by the substrate 3, if this substrate is electrically conducting, or by an electrically conducting layer of the multilayer structure 5. The common conductor 9A is connected to a common connection face 13, while separate connecting tracks 11 are each connected to a separate connection face 15. The common conductor 9A, on the one hand, and the head elements 7, on the other hand, may be present in different planes, while electric through-connections 17 and possibly electric tracks 9a are present between the common conductor 9A and the head elements 7. In that case, an electric through-connection 19 and possibly an electric track 9b are present between the common conductor 9A and the connection face 13.

Figure 2:
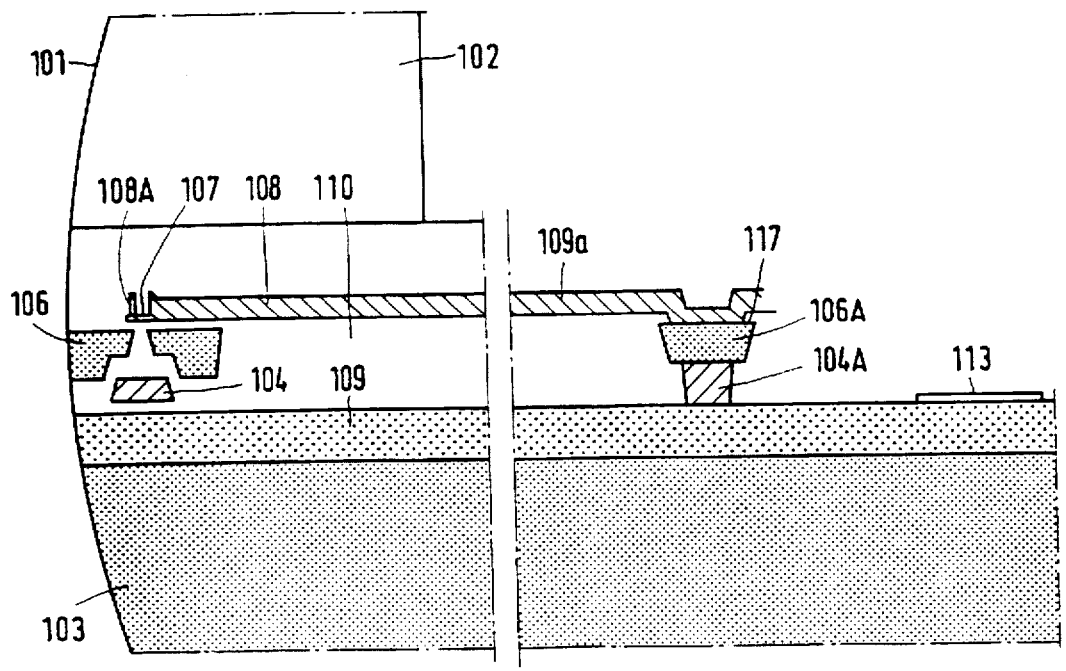
FIG. 2 shows diagrammatically a first embodiment of the magnetic head in a cross-section taken on the line II—II in FIG. 1.

The embodiment of the magnetic head according to the invention, shown in FIG. 2, is a multiple read head. The Figure only shows a head element of the magnetic head. The magnetic head has a head face 101 and comprises a substrate 103 of an electrically non-conducting, soft-magnetic material such as an NiZn ferrite, provided with a thin-film structure and a protective counterblock 102 of, for example, BaTiO$_3$ or CaTiO$_3$. The thin-film structure may be obtained by means of known techniques such as sputtering, etching, etc. The thin-film structure is provided, inter alia, with an electrically conducting layer 109 of, for example, gold. The thin-film structure is also provided with conducting layers 104 of, for example, gold, constituting test and/or bias windings, and layer portions 104A, preferably of the same electrically conducting material. Moreover, the thin-film structure is provided with soft-magnetic layers 106 of, for example, an NiFe alloy for constituting flux guides. Electrically conducting layer portions 106A, preferably of the same material as the layers 106, are preferably formed simultaneously with the layers 106. The thin-film structure is further provided with layers of a magnetoresistive material, such as an NiFe alloy, for constituting magnetoresistive elements 107, and layers 108 of an electrically conducting material, for example Au, for forming structures of equipotential strips 108A on the magnetoresistive elements 107 and for forming electrically conducting strips contacting the magnetoresistive elements 107. A number of strips 109a of these electrically conducting strips is in contact with the layer portions 106A which, together with the layer portions 104A, constitute electric through-connections 117 to the electrically conducting layer 109. The layer 109 constitutes a common conductor for a set of connecting tracks, of which the conducting tracks 109a in contact with the layer portions 106A form part, while the electric layer 109 is provided with a common connection face 113. The conducting strips in the layers 108, which are not in contact with the layer portions 106A, each function as separate connection tracks terminating in a separate connection face. For the sake of completeness it is to be noted that insulating layers of, for example, SiO$_2$ or Al$_2$O$_3$ extend between various layers of the layers mentioned above. The insulating layers are not shown separately in the Figure, but are only denoted by the reference numeral 110. It is also to be noted that only one layer and a layer portion of the layers 104, 106 and 108 and the layer portions 104A and 106A being present, respectively, are visible in the Figure.

Figure 3:
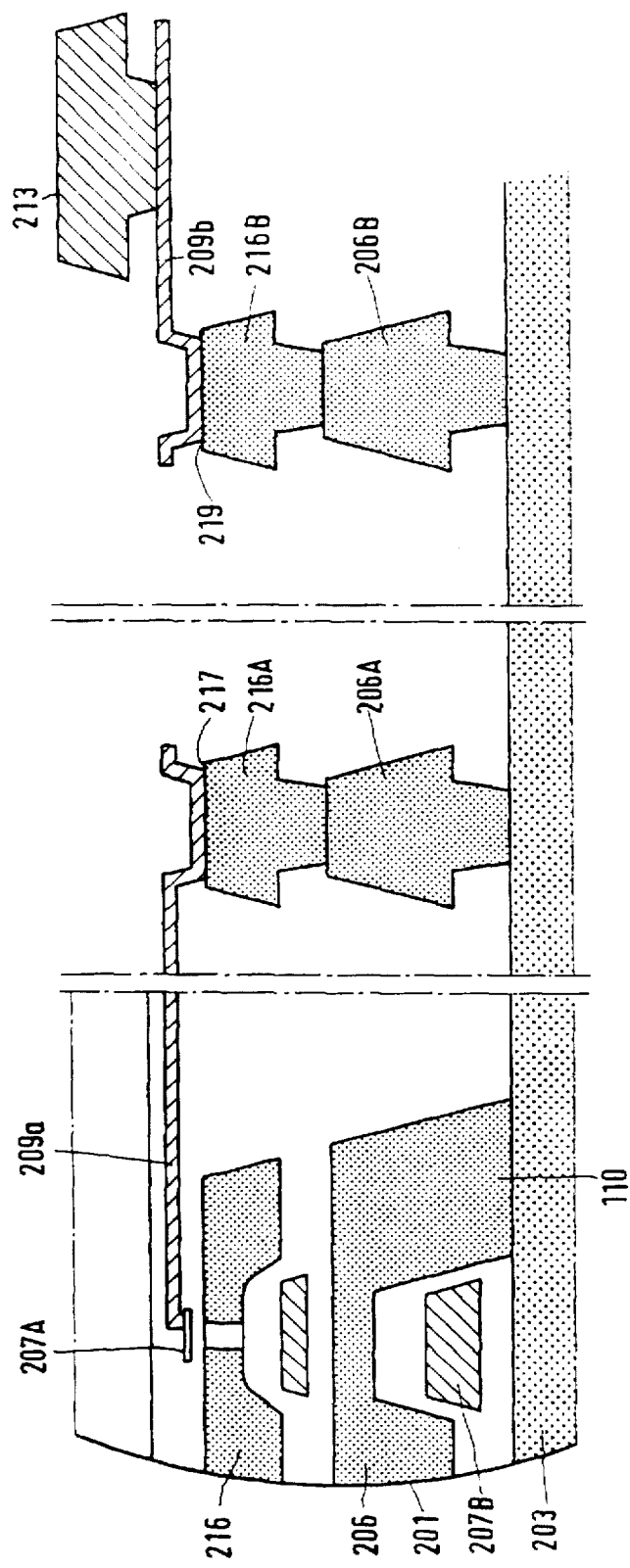
FIG. 3 shows diagrammatically a second embodiment in a cross-section taken on the line III—III in FIG. 1.

The embodiment shown in FIG. 3 is a multiple read/write head having a head face 201. This magnetic head comprises a substrate 203 of a soft-magnetic, electrically conducting material such as MnZn ferrite, and a multilayer structure which is present on the substrate 203. Viewed in a direction transverse to the head face, this structure comprises a plurality of juxtaposed read/write units, only one of which is visible in the Figure. Each read/write unit has a read element in the form of a magnetoresistive element 207A in the multilayer structure and a write element in the form of an inductive element 207B. Each read/write unit also has a first soft-magnetic layer 206 of, for example, an NiFe alloy in the multilayer structure, which layer constitutes a shared flux guide, an electrically conducting first layer portion 206 of, for example an NiFe alloy, copper or gold, which layer portion 206A is in contact with the conducting substrate 203, a second soft-magnetic layer 216 of, for example an NiFe alloy, constituting an interrupted flux guide, and a second layer portion 216A of, for example an NiFe alloy, copper or gold, which layer portion is in contact with the layer portion 206A.

The read/write unit shown also has a further first layer portion 206B which is in electrical contact with the substrate 203, and a further second layer portion 216B which is in electrical contact with the layer portion 206B.

Electrically insulating material 110, such as quartz, is present between the substrate 203, the inductive element 207B, the first layer 206, the second layer 216 and the magnetoresistive element 207A. The layer portions 206A and 216A and the layer portions 206B and 216B constitute through-connections 217 and 219, respectively, with the electrically conducting substrate 203 in the insulating material of the layer structure. The magnetoresistive elements 207A of the magnetic head are provided with connecting tracks which terminate in connection faces to which external electronic means can be connected. A set of these connecting tracks terminates in a common connection face 213. This set of connecting tracks is also characterized in that the electrically conducting substrate 203 serves as a common conductor for this set, while conducting tracks 209a connected to the magnetoresistive element 207A blend with the substrate 203 via the through-connections 217, and the through-connection 219 connects the substrate 203 to an electrically conducting track 209b which is contact with the connection face 213.

Each connecting track which does not terminate in the common connection face 213 may terminate in its own connection face in a manner as is shown diagrammatically in FIG. 1 by means of the connecting tracks 11 and the connection faces 15.

Figure 4:
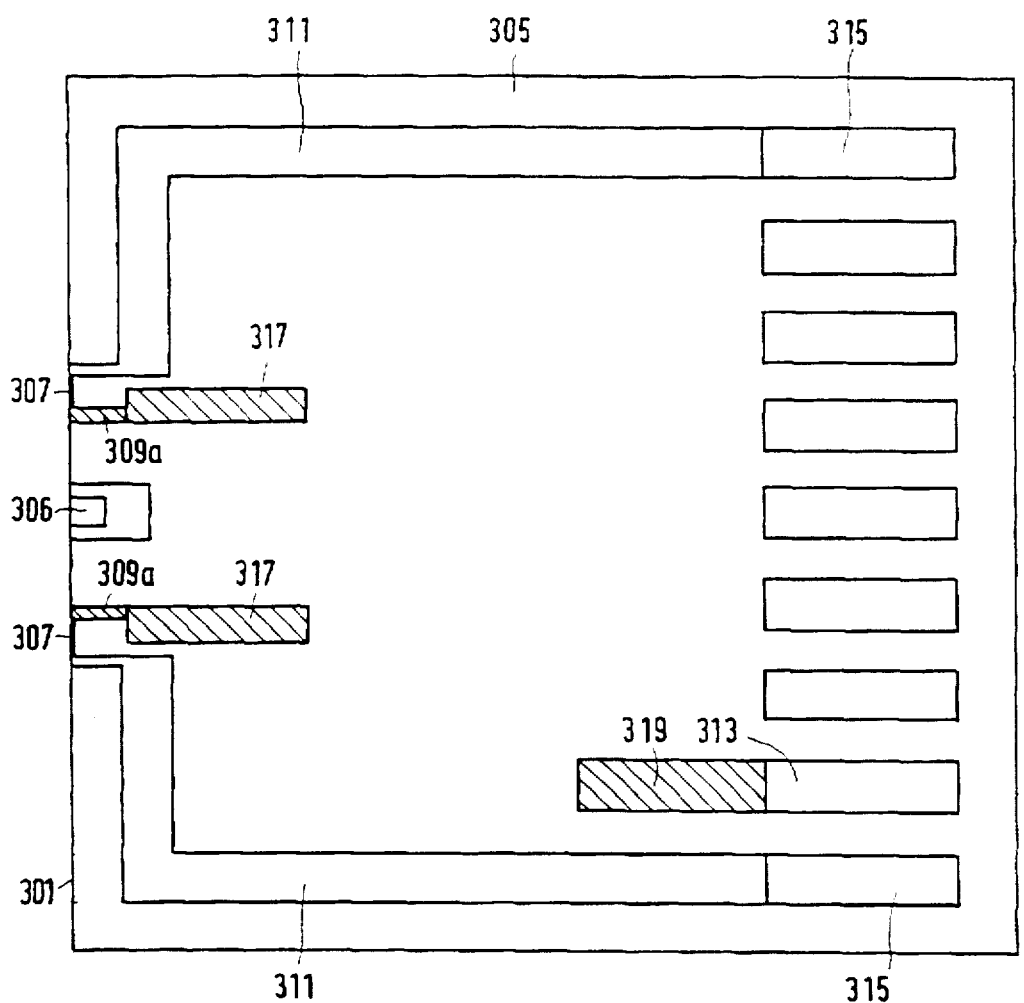
FIG. 4 shows diagrammatically, in a cross-section, a third embodiment of the magnetic head according to the invention.

The magnetic head according to the invention, shown in FIG. 4, has a head face 301 and comprises a substrate which is provided with a multilayer structure 305. The multilayer structure 305 is provided with a transducing system 306 comprising, for example, one or more magnetoresistive elements. The structure 305 is further provided with head elements in the form of head face sensors 307 which adjoin the head face 301. The sensors 307, which serve to provide information about the head face which is being produced in the manufacture of the magnetic head, are electrically arranged between electrically conducting connecting tracks 309a and electrically conducting connecting tracks 311. The connecting tracks 309a blend via through-connections 317 with a common conductor which is present in a further face, which common conductor is connected to a common connection face 313 via a through-connection 319. Each connecting track 311 terminates in a separate connection face 315.

Figure 5:
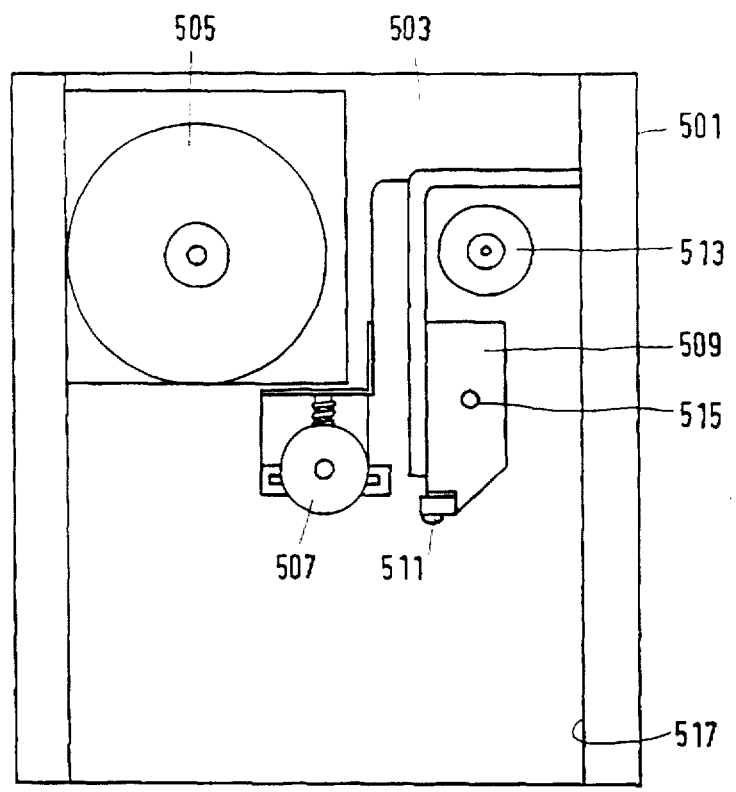
FIG. 5 shows diagrammatically a device according to the invention.
Figure 6:
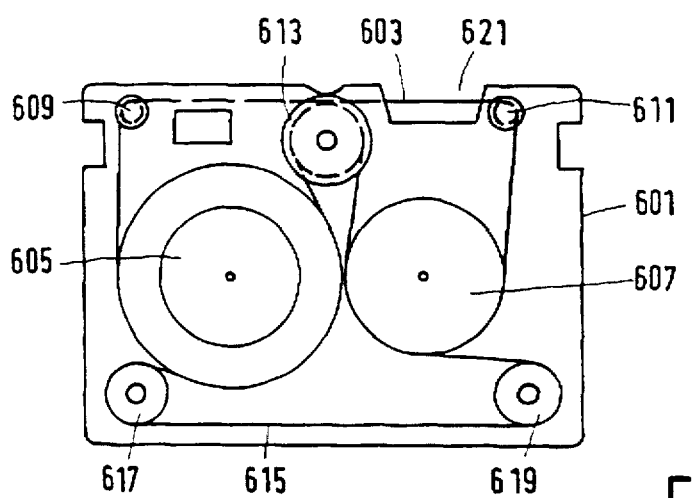
FIG. 6 shows diagrammatically a magnetic tape cassette suitable for cooperation with the device according to the invention.

The device according to the invention, shown in FIG. 5, is suitable for writing and/or reading a magnetic tape 603 present in a cassette 601 shown in FIG. 6. The device has a housing 501 with a frame 503. The housing 501 accommodates, inter alia, a drive motor 505 for driving a drive roll 507, a magnetic head 511 according to the invention, secured in this embodiment to a sub-frame 509, and a drive motor 513 for moving the sub-frame 509 along a guide shaft 515. The device is also provided with a guiding means 517 for sliding the cassette 601 into and out of the housing 501. In principle, the cassette 601 is intended for storing data information. The cassette has two take-up reels 605 and 607 holding the greater part of the magnetic tape 603. The part of the magnetic tape 603 present between the two reels is passed along two tape guides 609 and 611, which are fixed in this embodiment, and travels along a capstan 613. The cassette 601 accommodates an endless drive belt 615 travelling along the capstan 613, the reels 605 and 607 and two belt guides 617 and 619. In the operating state, in which the cassette 601 cooperates with the device 501 according to the invention, the magnetic head 511 projects into a recess 621 in the cassette and is then in contact with the magnetic tape 603. Simultaneously, the drive roll 507 is in contact with the capstan 613, via which the magnetic tape 603 is longitudinally movable from the one to the other reel.

Although the device shown is a data-storage device, the device according to the invention is not limited thereto. It may alternatively be an audio or video device. The invention is neither limited to the magnetic heads shown. The measures used may be successfully used in various types of thin-film magnetic heads, particularly read heads, write heads and read/write heads, irrespective of the number of head elements.

I claim:

1. A magnetic head having a head face and comprising a multilayer structure on a substrate the multilayer structure provided with a plurality of electrically conducting head elements, the head elements each connected to a pair of connection faces by electrically conducting connecting tracks, characterized in that the pair of connection faces for each head element consists of a first separate connection face connected to the head element by a separate connection track, and a second common connection face connected to the head element by a common conductor.

2. A magnetic head as claimed in claim 1, characterized in that the common conductor is constituted by an electrically conducting layer of the multilayer structure.

3. A magnetic head as claimed in claim 1, characterized in that the common conductor is present on a different level of the multilayer structure than the head elements, the common and separate connection faces and the separate connection tracks, and electric through-connections are present between the common conductor and the head elements.

4. A magnetic head as claimed in claim 3, characterized in that the common conductor is constituted by an electrically conducting substrate.

5. A magnetic head as claimed in claim 3, characterized in that the common conductor and the common connection face are present in different planes, and an electric through-connection is present between the common conductor and the common connection face.

6. A magnetic head as claimed in claim 1, characterized in that the head elements are transducing elements.

7. A magnetic head as claimed in claim 6, characterized in that the transducing elements are magnetoresistive elements.

8. A device for writing and/or reading a magnetic record carrier, including the magnetic head as claimed in claim 1.

* * * * *